(12) United States Patent
Gentric et al.

(10) Patent No.: US 11,386,074 B2
(45) Date of Patent: Jul. 12, 2022

(54) MAINTAINING CONSISTENCY OF DATA BETWEEN COMPUTING NODES OF A DISTRIBUTED COMPUTER ARCHITECTURE

(71) Applicant: AMADEUS S.A.S., Biot (FR)

(72) Inventors: Philippe Francois Georges Gentric, La-Colle-sur-Loup (FR); Yannick Guiraud Devaux, Mougins (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 16/985,513

(22) Filed: Aug. 5, 2020

(65) Prior Publication Data

US 2021/0042292 A1 Feb. 11, 2021

(30) Foreign Application Priority Data

Aug. 6, 2019 (FR) ...................... 1909019

(51) Int. Cl.
*G06F 16/00* (2019.01)
*G06F 16/23* (2019.01)
(Continued)

(52) U.S. Cl.
CPC ...... *G06F 16/2365* (2019.01); *G06F 9/30036* (2013.01); *G06F 16/2358* (2019.01); *G06F 16/27* (2019.01); *G06F 16/285* (2019.01)

(58) Field of Classification Search
CPC ............. G06F 16/2228; G06F 21/6245; G06F 16/2365; G06F 16/27; G06F 16/9535; G06F 16/9536; G06F 3/04847; G06F 16/22; G06F 16/2358; G06F 16/2379; G06F 16/245; G06F 16/24539; G06F 16/24549; G06F 16/2455; G06F 16/285; G06F 16/319; G06F 16/587; G06F 16/901; G06F 16/9024; G06F 16/904; G06F 16/93; G06F 16/951; G06F 16/9537; G06F 3/0481; G06F 3/0482; G06F 40/42; G06F 9/30036; G06F 9/547; G06F 2211/005; G06F 16/24575; G06F 3/0488; G06F 40/00; G06F 9/5072; G06F 3/04817; G06F 3/0483; G06F 3/04842;
(Continued)

(56) References Cited

U.S. PATENT DOCUMENTS 5,765,171 A 6/1998 Gehani et al.
6,098,078 A 8/2000 Gehani et al.
(Continued)

*Primary Examiner* — Shyue Jiunn Hwa
(74) *Attorney, Agent, or Firm* — Perry + Currier, Inc.

(57) ABSTRACT

The present invention relates to a method and a system for maintaining consistency of data between data-sets stored in a master database of a master computing node and corresponding data-sets stored in a replication database of at least one replication computing node. Each time an updated version of a stored data set is received, the master computing node is configured for updating a corresponding data-set stored in the master database and transmitting replication data relating to the updated data-set version to the at least one replication computing node for replication. The replication data comprising a bit-vector storing data values extracted from data fields of the data-set classified as volatile data fields. The data values stored in the bit-vector representing the changes in the data-set to be replicated in the at least one replication node.

16 Claims, 11 Drawing Sheets

(51) Int. Cl.
*G06F 16/27* (2019.01)
*G06F 16/28* (2019.01)
*G06F 9/30* (2018.01)

(58) Field of Classification Search
CPC .... G06F 3/0485; G06F 3/0486; G06F 16/248;
G06F 2221/2141; G06F 11/3419; G06F
21/50; G06F 2221/2111; G06F 13/00;
G06F 21/316
See application file for complete search history.

(56) References Cited

U.S. PATENT DOCUMENTS

2006/0074935 A1\* 4/2006 Zimmerer ............ G06F 16/283
2008/0294701 A1\* 11/2008 Saraswati ............ G06F 16/273
2014/0129530 A1\* 5/2014 Raufman ............ G06F 16/2272
707/693
2016/0328432 A1\* 11/2016 Raghunathan ...... G06F 16/2264

\* cited by examiner

Data Set Representation (DSR) structure

___ Level 1 data record
 ___ Level 2 data record
  ___ Level 3 data record
   ___ Level 4 data record
    ___ Volatile data field #1 (3bits)
    ___ Volatile data field #2 (2 bits)
   ___ Level 4 data record
  ___ Level 3 data record
  ___ ...
 ___ Level 2 data record
  ___ Level 3 data record
   ___ Level 4 data record
    ___ Volatile data field #2233456 (1bit)

Figure 6

MAINTAINING CONSISTENCY OF DATA BETWEEN COMPUTING NODES OF A DISTRIBUTED COMPUTER ARCHITECTURE

CROSS-REFERENCE TO RELATED APPLICATION

This application claims priority from French patent application no. 1909019, filed Aug. 6, 2019, the contents of which are incorporated herein by reference.

FIELD

The specification relates to a method and a system for maintaining consistency of data across a plurality of computing nodes of a distributed computing architecture. More specifically, the present invention relates to a method for maintaining consistency of data be-tween data-sets stored in a master database of a master computing node and corresponding data-sets stored in a replication database of at least one replication computing node.

BACKGROUND

Over the past few years, the distribution of services/applications through a cloud computing platform has become mainstream. The main advantage of cloud computing is that it abstracts most of the concerns relating to the physical hardware and/or software resources, thus enabling users to concentrate on their core business instead of focusing on the maintenance and deployment of data centers. The cloud computing model is based on providing a user with access to physical computing resources on a pay-as-you-go basis, whereby the user pays for the computing resources allocated to one or more application servers to run the required services/applications on the cloud computing platform. As the demand for the cloud operated services/applications changes, the underline physical resources can be dynamically scaled to meet the computing needs of the cloud services/applications at any given time.

A cloud computing platform is generally distributed among a plurality of computing nodes, e.g. data centers. Each computing node may be configured for running at least part of a service and/or application requested by a client, which may involve the manipulation of large amounts of data, e.g. sorting, joining, combining, and the like to generate a response to a client query. For many cloud applications, the manipulation of data may need to be performed at each computing node to generate fast response to the client query. Performing the manipulation of data at each computing node may necessitate the use of fresh data, which is data reflecting the latest changes, in order to ensure that the response forwarded to the client reflects the latest data updates. For example, when calculating the availability of flights in response to a client travel search query, it is important that the data pertaining to the calculation has been updated with the latest changes, thus ensuring the accuracy of the results forwarded to the client.

The current approaches for maintaining freshness of data in a distributed architecture vary widely. One method for maintaining freshness and consistency of data is the force approach, which involves taking a snapshot of the entire data-set to be replicated, dividing in into blocks, and transmitting for replication to the different replication nodes. However, such an approach involves the complete replication of the data-set, which would increase the amount of data transmitted over the network and the latency in replicating the data to the corresponding replication nodes. Therefore, an optimization for periodic updates consists in detecting which blocks have changed and only transmit these.

Another approach for replicating data between nodes is known as the multiple-master database replication, which leverages the database change event log to identify and transmit data changes between computing nodes in a distributed architecture. Each change detected is streamed as a message to the other computing nodes for replication. However, the transmitted message has a large overhead as it contains, in addition to the databases change, the key of the changed item, as well as the format (type) of the information transmitted, so that the receiving computing node can process each individual change, leading to a poor network transmission efficiency.

Another approach for replicating data is known as the INTRA-datacenter latency optimized approaches involving a serialization scheme such as Google protocol-buffer. These schemes aim at transmitting possibly extremely large arrays (terabyte big data) of exactly identical data structures (all packets have the same format) across processes and machines INTRA-datacenter. However, these serialization schemes are less flexible when it comes to data-sets containing data fields of different data size.

SUMMARY

Therefore, there is a need to identify a solution for replicating data to different computing nodes, that is flexible in relation to the data format and size of the data to be replicated, and network efficient in terms of transmission cost and latency.

An object of the present invention is to provide a solution that overcomes the disadvantages of prior art solutions. More specifically, the aim of the present invention is to provide a solution for replicating data between computing nodes in a flexible and network efficient manner.

The object of the present invention is achieved according to the invention with the system and method showing the technical characteristics of the aspects below.

According to a first aspect of the present invention, a method is provided for maintaining consistency of data between data-sets stored in a master database of a master computing node and corresponding data-sets stored in a replication database of at least one replication computing node, wherein each time an updated version of a stored data set is received, the master computing node is configured for updating a corresponding data-set stored in the master database and transmitting replication data relating to the updated data-set version to the at least one replication computing node for replication, each data-set comprising a plurality of data fields arranged in a predetermined layout defined according to a data-set representation (DSR) structure, which is stored together with each data-set in the master and replication databases, the method comprising: processing at the master computing node by means of a master processing module an updated version of a stored data-set, the step of processing comprising: receiving by means of a data receiving engine, the updated version of a stored data-set in the master database; processing the updated data-set version by means of a processing engine to generate the updated DSR structure; analysing the updated DSR structure by means of an analysing engine to extract the data fields of the updated data-set version; classifying by means of a classification engine the extracted data fields into stable data fields, comprising data values that change at a first frequency rate, and volatile data fields, comprising data values that change at a second frequency rate, which is higher than the first frequency rate, generating by means of a bit-vector engine, a bit-vector storing the data values extracted from the volatile data fields; preparing by means of a data preparation engine the data to be replicated at the least one replication computing node, the replication data comprising the generated bit-vector; and transmitting by means of a data transmission engine the replication data to the at least one replication computing node; and replicating at the at least one replication computing node by means of a replication module the replication data, the step of replication comprising: receiving by means of a replication data receiving engine the replication data; processing by means of a replication processing engine the replication data to extract the data values to be replicated; selecting by means of a DSR selection engine a replication DSR structure corresponding to the replication data; and replicating by means of a replication engine, based on the selected replication DSR structure, data values extracted from the replication data in the corresponding replication data-set.

It has been found that in the majority of cases, where a data-set comprises both stable data-fields and volatile data-fields, the data values of the volatile data fields would change faster than the data values of the stable data-fields. As a result, in many cases it may be more economical, in term of network data transmission costs, to transmit only the data-values of the data-set that may have changed compared to a previous version, rather than the entire data-set. This technique requires that the type of each data field in the data-set, whether stable or volatile, is correctly identified. The identification of the data field types may be performed by generating a DSR structure, which provides information on the layout of the data fields in the data-set. The information in the DSR structure may be used by a classification engine to classify the data fields into stable or volatile. The classification engine may use a range of data processing techniques, e.g. Machine Learning, combined with historical data to determine the rate at which the data values of each data field in the data-set changes over time, and accordingly classify the data fields into volatile or stable data fields. The data values of the volatile data fields would change at a higher rate than the data values of the stable fields. The data values of the volatile data-fields are extracted and stored in a bit-vector. The bit-vector is included, or at least partially included, in the replication data to be transmitted to the at least one replication computing node. At each replication computing node, the replication data, which may include the bit-vector and/or other information, is processed, and the data values to be replicated, are extracted. For each replication data the corresponding data-set is identified, and with the use of replication DSR structure, the data values extracted from the replication data are replicated to the corresponding data-fields. In the context of the present invention, the DSR data-set may be used as serialization/deserialization key for the replication data, e.g. the data values stored in the bit-vector structure. One of the advantages of the proposed replication approach, is that by transmitting, at least in most cases, only the changes occurred in the volatile data fields rather than the entire data-set, it is possible to reduce the amount of data transmitted over the network, thus reducing the associated network cost, while maintaining consistency and freshness of data between the master computing node and the at least one replication computing nodes. In the cases, where there are changes in the DSR structure, e.g. deletion/insertion of data-fields in the data-set, and/or changes in the stable data-fields it may be required to transmit the entire data-set and corresponding DSR structure for replication in the at least one replication computing node.

According to embodiments, the bit-vector is generated by concatenating the data values of the volatile data fields. The concatenated data values are linked together into a data string that forms the bit-vector, thus reducing the size of the data to be transmitted over the network. Furthermore, concatenating the data values of the volatile fields may result in a more efficient compression of the bit vector, which may further reduce the size of the data to be transmitted over the network.

According to embodiments, each volatile data field stores a data value of a predetermined data size represented by a number of bits. The DSR structure comprises information regarding the data size of each volatile and/or stable data fields. The data size of each volatile data field may be used to calculate the maximum length of the bit-vector. Furthermore, the data size may be used as an identification marker for identifying the data values corresponding to the different volatile data fields.

According to embodiments, the bit-vector is configured to store serially the bits representing the data-value of each volatile data field. The bit-vector is configured to store the bits representing the data value of each data field in series, i.e. one bit after another, which may further enhance compression, since it does not require any formatting, and reduce network transmission costs.

According to embodiments, the bit-vector is configured to store the data-values of the volatile data fields in the order defined in the DSR structure for the corresponding data-set. As such, the DSR structure for each data-set may be used as a serialization key in the master computing node when generating the bit-vector and/or the replication data, and/or as a deserialization key when replicating the data extracted from the replication data in the at least one computing node. Because the DSR structure is stored together with the corresponding data-set in the master and at least one replication computing nodes, it does not need to be transmitted together with the replication data. As a result, the proposed replication approach may further contribute to the reduction of data to be transmitted over the network.

According to embodiments, the replication data is compressed by means of a compression engine of the data transmission engine before it is transmitted to the at least one replication computing node, where it is decompressed by a decompression engine of the data receiving engine. The compression reduces the size of the data to be transmitted, thus reducing the associated network cost.

According to embodiments, the compression engine is configured for selecting a compression method from a compression database, the compression method applied to the replication data is encoded and transmitted to the at least one replication node, where it is used by the decompression engine to select a corresponding decompression method from a decompression database to decompress the replication data. In this way, the compression engine may select the best compression method for reducing the size of the replication data, thus reducing the network transmission cost. The compression method may be encoded in the replication message, e.g. the header of the message, so that decompression engine is able to identify the decompression method corresponding to the compression method applied. In this way, it is ensured that the compression and decompression of the replication is performed without any loss of information. The compression and decompression databases may be maintained by a user and updated regularly. Each compression and decompression method may be selected depending on criteria such as the size of the data to be replicated, network constraints, and the like.

According to embodiments, the data to be transmitted is compressed by means of run-length encoding (RLE) compression algorithm. The RLE compression algorithm is configured to encode a sequence of identical bits in the bit-vector as a number representing the length of the sequence. In some cases, a predetermined symbol may be used to denote a bit that may be skipped or that it has not changed. The use of symbols and the number representation of the length of the bit sequence in the bit vector may increase the efficiency of the compression algorithm.

According to embodiments, the replication data consists of the bit-vector, or the bit-vector and the DSR structure. Depending on the number of changes detected between the previous DSR structure and the updated DSR structure, it may be useful to transmit the bit-vector only, or the bit-vector and the updated DSR structure. At the replication node, the bit-vector and/or the updated DSR structure are stored in the replication database associated with the corresponding data-set. The replication node may be configured to replicate a plurality of data-sets. Each of the plurality of data-sets may be stored in a corresponding replication database. The replication data may contain additional information identifying the data-set associated with the replication data. For example, additional bits may be inserted in the bit vector specifying the corresponding data-set at the replication node.

According to embodiments, wherein the generated bit-vector is encoded as a difference from a bit vector generated for a previous version of the corresponding data-set. The compression and decompression ensure that the size of the data transmitted over the network is reduced, thus reducing the associated network transmission costs.

According to embodiments, the step of generating a bit-vector comprises comparing the updated DSR structure with the DSR structure of the data-set stored in the master database to identify differences in the layout of the data fields in the updated data-set, and wherein when a difference in the data-set layout is detected the entire updated DSR structure and/or the entire updated data-set is included in the replication data. Over time, the structure of the data-set may change or expire. Furthermore, over time, the data values of the stable data fields may also change. Therefore, when changes are detected at least the DSR structure of the updated data-set is transmitted together with the bit-vector to at least one replication computing node. The entire updated data-set may also be transmitted for replication in the at least one replication computing node, e.g. when a change is detected in the data values of the stable data fields or a change in the layout has occurred due to the addition or deletion of a data fields. At the replication node, the transmitted DSR structure would replace the DSR structure stored in the replication database for the corresponding data-set. In the case where the entire updated data-set is transmitted with the replication data, then the transmitted data-set would replace the corresponding data-set stored in the replication database of the at least one replication computing node.

According to embodiments, wherein the step of selecting the replication DSR structure at the at least one replication computing node comprises determining whether the replication data comprises an updated DSR structure, wherein when an updated DSR structure is transmitted then it is selected as the replication DSR structure, otherwise the DSR structure of the stored replication data set is selected as the replication DSR structure. As previously described in overtime the DSR structure stored in the replication database of the at least one replication computing node would expire and/or change, thus it is important that when an updated DSR structure is transmitted as part of the replication data, it replaces the corresponding DSR structure, and further selected for mapping the data values extracted from the replication database to the correct data-fields of the corresponding data-set stored in the replication database. In this way, it may be ensured that the extracted values are associated with the most up to date version of the DSR structure for the corresponding data-set.

According to embodiments, wherein the step of transmitting comprises dividing the replication data into data packets, which are independently transmitted to the at least one replication computing node where they are collected and processed by a data reconstruction engine of the data receiving engine to reconstruct the replication data. By breaking the replication data into data packets, it becomes possible to transmit the data packets in parallel thus increase the speed at which the data is transmitted from the master computing node to the at least one replication computing node. Further, breaking the bit-vector into smaller data packets may be necessary to satisfy the bandwidth of the transmission communication network. For example, in the case where the size of the bit-vector is larger than the acceptable Maximum Transmit Unit (MTU) of the communication network.

According to embodiments, wherein the first data value of each data packet defines an offset value associated with the position of the data packets in the replication data. The first data value of a data packet may be indicative of the offset of the data packet in the transmitted data. According to embodiments, the offset value may be indicative of the number of data bits separating the first bit of the bit-vector and/or the replication data from the first bit of each data packet. For example, if the bit-vector in the replication data contains a thousand bits, and the bit-vector is divided into five data packets of two-hundred bits each, then the offset value of the first packet would indicate that there are zero bits separation, the offset value of the second packet would indicate that there are one-hundred and ninety-nine bits separating the first bit of the bit-vector from the first bit of the second data packet, the offset value of the third data packet would indicate that there are three hundred and ninety-nine bits separating the first bit of the bit-vector from the first bit of the third data packet, the offset value of the fourth data packet would indicate that there are five-hundred and ninety-nine bits separating the first bit of the bit-vector from the first bit of the fourth data packet, and the offset value of the fifth data packet would indicate that there are seven-hundred and ninety-nine bits separating the first bit of the bit-vector from the first bit of the fifth data packet. The offset value may be used by the data receiving engine at the at least one replication computing node to assemble the data packets so as to reconstruct the transmitted replication data.

According to embodiments, wherein the DSR structure generated for each corresponding data-set comprises at least one place-holder data field for accommodating changes in the DSR structure, the place-holder data field comprises a validity bit, the value of the validity bit is indicative of whether the place-holder data field contains a data value, which data value is classified as a volatile data value. The place-holder data fields may be used to accommodate changes in the data-set, e.g. addition, or deletion of a volatile data field. Each place-holder data field comprises a validity bit. The value of the validity bit indicates whether the place-holder data field contains a data value. For example, in a DSR structure containing five place-holder data fields, if there is an insertion of one volatile data field in the data-set, then one of the place-holder data fields may be selected to accommodate the change in DSR structure, i.e. the insertion of the new volatile data field, and the value of the corresponding validity bit would be changed from "false", indicating that the place-holder data fields is not in use, to "true", indicating that the place-holder data field is in use and contains a volatile data value, while the validity bit value of the remaining four place-holder data fields would remain "false". Moreover, in the case of a deletion of one volatile data field from a DSR structure where all the place-holder data fields are in use, and their corresponding validity bits are set to "true", the change in the DSR structure, i.e. the deletion of one volatile data field, may be accommodated by setting the validity bit of one of the place-holder data fields to "false" indicating that the corresponding place-holder data-field is not in use. In this way, it may be possible to prolong the life expectancy of the DSR structure, as long as the records contained in the updated data-sets follow the same pre-defined data structure and the number of added volatile data fields does not exceed the number of provisioned place-holders. The addition of place-holder data fields in the DSR may further reduce data transmission costs because the updated DSR structure is only transmitted when the changes exceed the number of place-holder data fields. In certain cases, only a limited number of place-holders may be required, e.g. four or five, depending on the data set type. Whenever the changes in the data-set exceed the number of place-holder data fields, the stored DSR structure, in the master and replication computing nodes, is replaced with the updated DSR structure. The DSR structure needs to be replaced whenever a structural change in the data-set occurs, e.g. change of the pre-defined data structure. It should be noted, that it is possible for all fields of the data-set to be defined in the DSR structure as place-holder data-fields. Depending on the application and the corresponding data-set the designer, or developer, of the application may decide a) how many "empty place holders", with validity bit set to "false" are desirable to accommodate future insertions, b) which fields should be "full place holders", with validity bit set to "true", and whether any of them need to be deleted to accommodate data field deletions in the DSR structure.

According to a second aspect of the present invention, a consistency acceleration engine may be provided for maintaining consistency of data between data-sets stored in a master database of a master computing node and a replication database of at least one replication computing node of a distributed computer architecture, wherein each time an updated version of a stored data set is received, the master computing node is configured for updating a corresponding data-set stored in the master database and transmitting the replication data relating to the updated data-set version to the at least one replication computing node for replication, each data-set comprising a plurality of data fields arranged in a layout defined according to a corresponding data-set representation (DSR) structure, which is stored together with the corresponding data-set in the master and replication databases, the consistency acceleration engine comprising: a master processing module configured to process at the master computing node a stored data-set, the master processing module comprising: a data receiving engine configured to receive an updated version of a stored data-set corresponding to a stored data-set in the master database; a processing engine configured to process the updated data-set version to generate its associated updated DSR structure; an analyzing engine configured to analyze the updated DSR structure to extract the data fields of the updated data-set version; a classification engine configured to classify the extracted data fields into stable data fields, comprising data values that change at a first frequency rate, and volatile data fields, comprising data values that change at a second frequency rate, which is faster than the first frequency rate a bit-vector engine configured to generate a bit-vector storing the data values extracted from the volatile data fields; a data preparation engine configured to prepare the data to be replicated, the replication data comprising the generated bit-vector; and data transmission engine configured to transmit the replication data to the at least one replication computing node; and a replication module configured to replicate at the at least one replication computing node the replication data, the replication module comprising: a replication data receiving engine configured to receive the replication data; a replication processing engine configured to process the replication data to extract the data values to be replicated; a DSR selection engine configured to select a replication DSR structure corresponding to the replication data; and a replication engine configured to replicate, based on the selected replication DSR structure, the extracted replication data values in the corresponding replication data-set stored in a replication database.

According to embodiments of the second aspect, the bit-vector is generated by concatenating the data values of the volatile data fields.

According to embodiments of the second aspect, each volatile data field stores a data value of a predetermined data size represented by a number of bits.

According to embodiments of the second aspect, the DSR structure comprises the data size of each volatile data field.

According to embodiments of the second aspect, the bit-vector is configured to store serially the bits resenting the data-value of each volatile data field.

According to embodiments of the second aspect, the bit-vector is configured to store the data-values of the volatile data fields in the order defined in the DSR structure for the corresponding data-set.

According to embodiments of the second aspect, the compression engine is configured to compress the replication data before it is transmitted to the at least one replication computing node, where it is decompressed by a decompression engine of the data receiving engine.

According to embodiments of the second aspect, the compression engine is configured for selecting a compression method from a compression database, the compression method applied to the replication data is encoded and transmitted to the at least one replication node, where it is used by the decompression engine to select a corresponding decompression method from a decompression database to decompress the replication data. In this way, the compression engine may select the best compression method for reducing the size of the replication data, thus reducing the network transmission cost.

According to embodiments of the second aspect, the compression engine compresses the data to be transmitted with run-length encoding (RLE) compression algorithm.

According to embodiments of the second aspect, the replication data consists of the bit-vector, or the bit-vector and the DSR structure.

According to embodiments of the second aspect, the bit-vector engine is configured to encode the generated bit-vector as a difference from a previous version of the bit-vector for the stored data-set in the master database.

According to embodiments of the second aspect, the bit-vector engine is configured for generating the bit-vector by comparing the updated DSR structure with the DSR structure of the data-set stored in the master database to identify differences in the layout of the data fields in the updated data-set, and wherein when a difference in the data-set layout is detected the entire updated DSR structure and/or the entire updated data-set is included in the replication data.

According to embodiments of the second aspect, wherein the DSR selection engine is configured to select the corresponding replication DSR structure by determining whether the replication data comprises an updated DSR structure, wherein when an updated DSR structure is transmitted then it is selected as the replication DSR structure, otherwise the DSR structure of the stored replication data set is selected as the replication DSR structure.

According to embodiments of the second aspect, wherein the data transmission engine is configured to divide the replication data into data packets, which are independently transmitted to the at least one replication computing node where they are collected and processed by a data reconstruction engine of the data receiving engine to reconstruct the replication data.

According to embodiments of the second aspect, the first data value of each data packet defines an offset value associated with the position of the data packets in the replication data.

According to embodiments of the second aspect, the offset value is indicative of the number of bits separating the first bit of the bit-vector from the first bit of each data packet.

According to embodiments of the second aspect, the processing engine is configured to generate a DSR structure for each corresponding data-set comprising at least one place-holder data field for accommodating changes in the DSR structure, the place-holder data-field comprises a validity bit, the value of the validity bit is indicative of whether the place-holder data field contains a data value, which data value is classified as a volatile data value.

BRIEF DESCRIPTIONS OF THE DRAWINGS

The following drawings are provided as an example to explain further and describe various aspects of the invention.

FIG. 6 shows an example of a Data Set Representation (DSR) structure according to embodiments of the present invention.

DETAILED DESCRIPTION

The present invention will be illustrated using the exemplified embodiments shown in FIGS. 1 to 11, which will be described in more detail below. It should be noted that any references made to dimensions are only indicative and do not restrict the invention in any way. While this invention has been shown and described with reference to certain illustrated embodiments thereof, it will be understood by those skilled in the art that various changes in form and details may be made therein without departing from the scope of the invention encompassed by the appended claims. Furthermore, while the invention has been described with references to a particular system and/or a method for maintaining consistency of data between data-sets stored in a master database of a master computing node and corresponding data-sets stored in a replication database of at least one replication computing node, it should be understood by those skilled in the art that changes in form and details may be made to facilitate other types of method and/or systems in related fields without departing from the scope of the invention encompassed by the appended claims.

Figure 1:
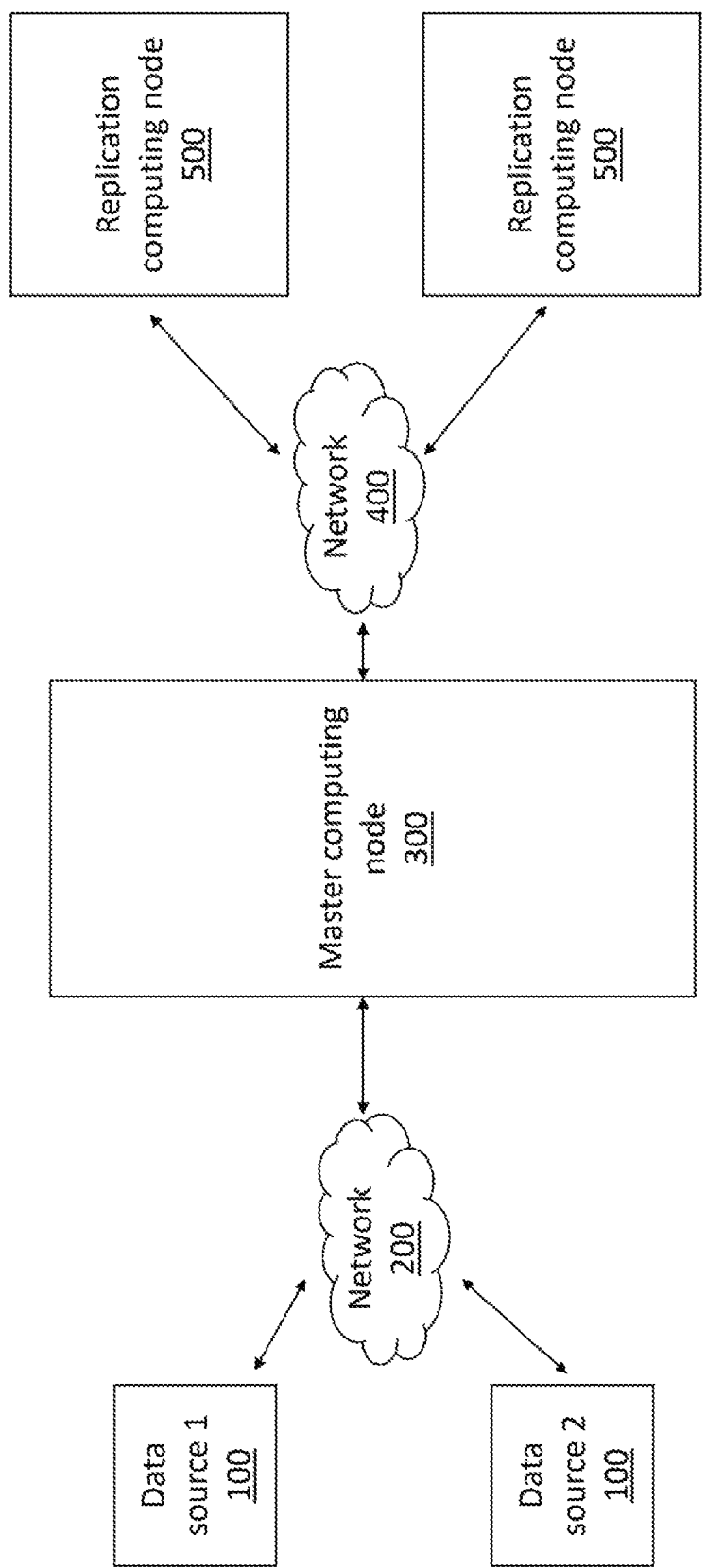
FIG. 1 shows an example of a distributed data storage system according to embodiments of the present invention.

FIG. 1 shows an example of a distributed data storage system according to embodiments of the present invention. The distributed storage system may be provided with a master computing node 300 configured to handle and store data received from a plurality of data sources 100 over a first communication network 200. The master computing node 300 may be implemented by a number of computer servers of a first data center. Each data source 100 may be configured to communicate to the master computing node 300 a specific type of data structured in a predetermined data format. For example, each data source 100 may represent a different airline system, each communicating to the master computing node 300 at least one data-set containing information relating to the airline's flight schedule, availability, routes, aircraft types, airports, affiliate airline network, and other similar information. The data-sets communicated by each data source 100 may be valid only for a specific period of type, and thus may contain an expiration time limit. The master computing node 300 may be configured to communicate the data-sets received from the data sources 100 to replication computing nodes 500 over a second communication network 400, where the data-sets are processed and stored. Each replication computing node 500 may be implemented by a number of computer servers of a data center, which may be located at a different geographical location from the master computing node 300 and the other replication computing nodes 500. For example, the master computing node 300 may be implemented in a data center located in Europe, one of the replication computing nodes 500 may be implemented in a data center located in North America, while another replication computing node 500 may be implemented in a data center located in Asia. The data stored at each replication computing node 500 may be accessed by a plurality of customers. The location of each replication computing node 500 may be decided according to how fast customers can access the relevant data. For example, for a Travel Agent located in North America, it would be faster to access data that is stored in a replication computer node 500 located in the same geographical region, compared to accessing data that is stored at a replication computing node 500 located in Europe or Asia. Therefore, it is important that the data stored in each replication computer node 500 is refreshed regularly to accurately reflect the latest data updates received at the master computing node 300 from the different data sources 100. For example, in the travel industry, it is important that the seat availability of a specific flight is accurately reflected on all replication computing nodes 500. Otherwise, there is a risk that an invalid booking is made on an already fully booked flight, which would only be discovered at a later stage. Currently, the main approach of maintaining the freshness and consistency of data, between data-sets stored in a master computing node 500 and corresponding data-sets stored in a replication computing node 300, is to periodically transmit for the replication the entire data-sets from the master computing node 300 to all replication computing nodes 500. Although the existing approach ensures the freshness and consistency of data across different computing nodes, it has a high associated network communication cost, due to the large amount of data that needs to be transmitted over the network. However, when updating stored data-sets, it is not always necessary to transmit the entire updated data-sets to the replication computing nodes. In most cases, each data-set would contain data fields storing data values that are highly volatile and are bound to change at a faster rate compared to the data values stored in other data fields of the same data-set. Therefore, in most cases, it is sufficient to transmit only the data values of the data-sets that have changed compared to previous versions, and only transmit the entire updated data-sets when there is a fundamental difference, e.g. in the data structure, data types, and the like. By transmitting the data values that have been changed rather than entire updated data-sets has been shown to dramatically reduce the communication bandwidth requirements for maintaining the freshness and consistency of data stored across different computing nodes over time. As a result, due to the reduction in the communication bandwidth requirements, there would be an associated reduction in the network communication cost. This is achieved by providing a consistency acceleration engine and an associated method for maintaining consistency of data across different computing nodes.

Figure 2:
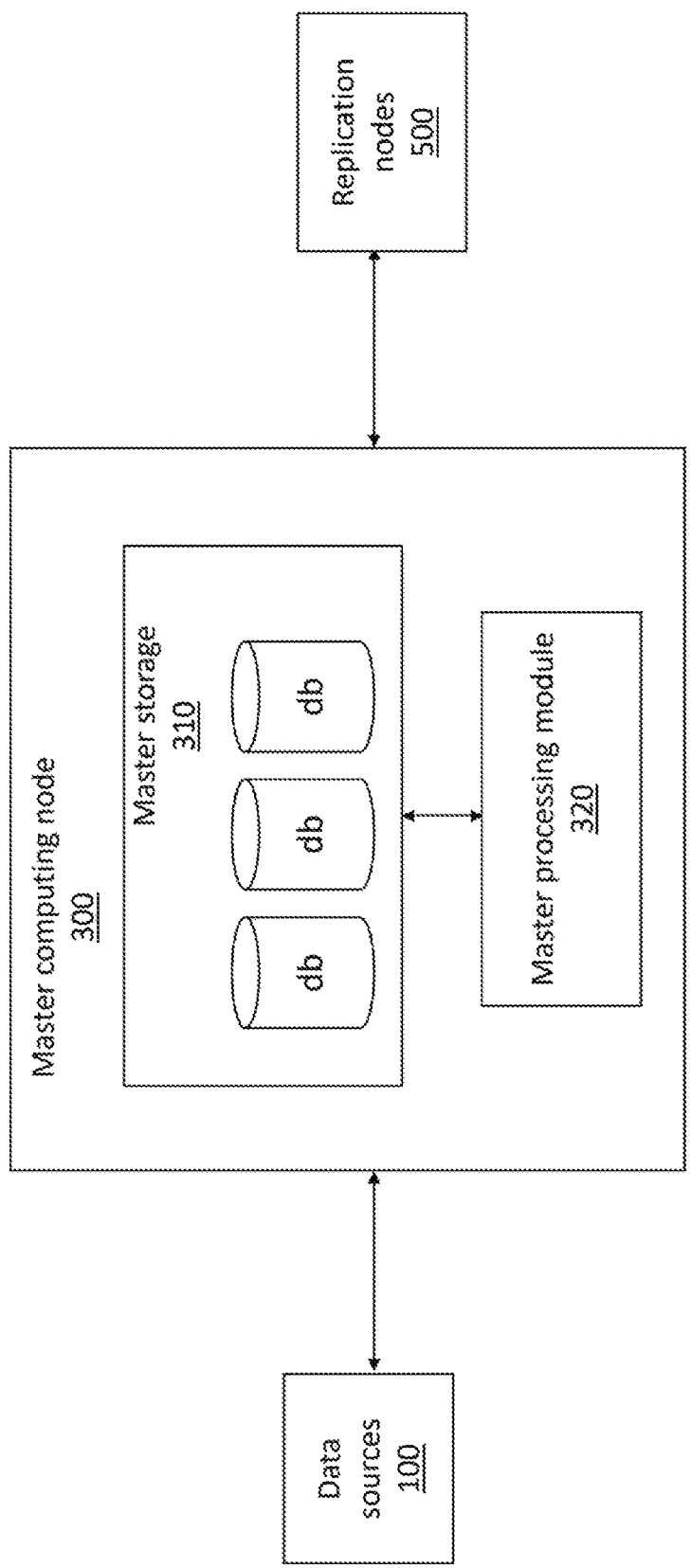
FIG. 2 shows an example of a master computing node according to embodiments of the present invention.

FIG. 2 shows an example of a master computing node 300 according to embodiments of the present invention. The master computing node 300 is provided with master storage 310 configured for storing the data-sets received from the different data sources 100 on a number of master databases, along with their corresponding Data Set Representation (DSR) structure, which defines for each data-set the layout and/or structure of their representative data fields. The master computing node 300 may be provided with a master processing module, which is part of the consistency acceleration engine. The master processing module 320 is configured for processing each updated data-set received from the different data sources 100 to determine changes made to the data values and structure of the data fields compared to corresponding previous versions of each data-set stored in the master storage 310, which are communicated to the at least one replication computing node 500 for replication. The master processing module 320 updates the stored data-sets with the corresponding data updates.

Figure 3:
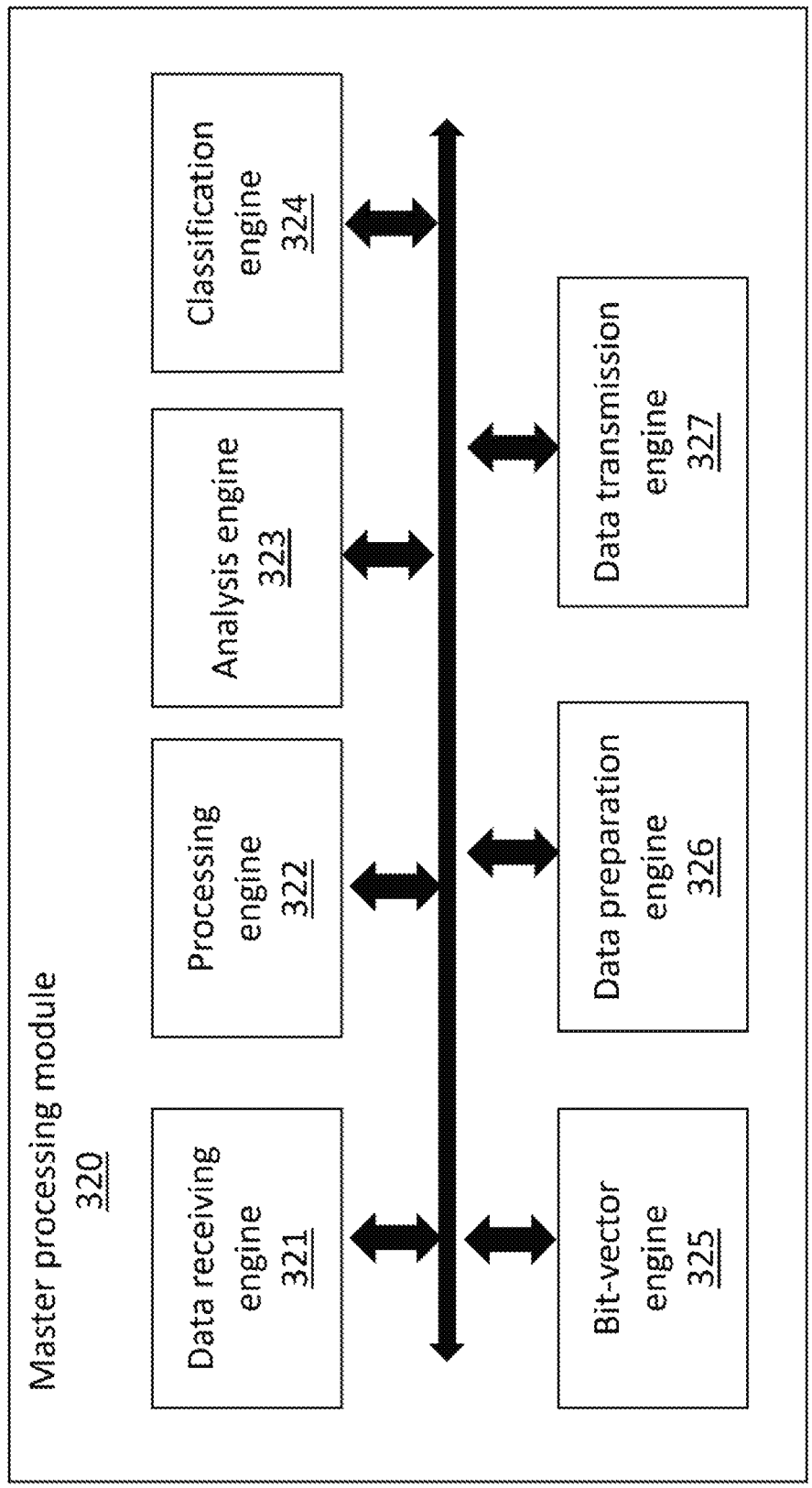
FIG. 3 shows an example of a master processing module according to embodiments of the present invention.

FIG. 3 shows an exemplified architecture for the master processing module 310. As shown, a data receiving engine 321 may be provided to receive updated data-sets from the different data sources 100 and for identifying the corresponding stored data-set in the master storage databases 310. Each updated data-set is then forwarded to a processing engine 322, where it is processed to generate its updated Data Set Representation (DSR) structure. Each updated DSR structure is then analyzed by an analyzing engine 323 to extract the data fields of the corresponding updated data-set version. The extracted data fields are then classified by means of a classification engine 324 into stable data fields, comprising data values that change at a first frequency rate, and volatile data fields, comprising data values that change at a second frequency rate, which is higher than the first frequency rate. The classification engine 324 may use a range of data processing techniques, e.g. Machine Learning, combined with historical data to determine the rate at which the data values of each data field in the data-set changes over time and accordingly classify the data fields into volatile or stable data fields. Once the data fields have been classified, a bit-vector engine 325 is used to extract the data values from the volatile data fields of each updated data-set and accordingly generate a corresponding bit-vector storing the extracted volatile data values. For each data-set, the bit-vector may be generated by concatenating the data values of the volatile data fields of the updated data-set. In the bit-vector, the data bits representing the data values of each volatile data field are stored serially, i.e. one data bit after another. The data values may be ordered in the bit-vector according to the order in which the volatile data fields are presented in the DSR structure corresponding to each processed, updated data-set. The generated bit-vector may be stored together with the corresponding updated data-set in the master storage 310. The generated bit-vector may be encoded as a difference from a bit vector generated for a previous version of the corresponding data-set. Once the bit-vector has been created for an updated data-set, a data preparation engine 326 may be used to prepare the data to be replicated at the least one replication computing node 500. The replication data may contain at least the generated bit-vector along with other information. The bit-vector engine 325 may be configured to compare the generated DSR structure of the updated data-set with the DSR structure of the corresponding data-set stored in the master database to identify differences in the data structure. In the case, where differences are detected in the data structure, e.g. addition or deletion of data fields, then the data preparation engine 326 is configured to include, in addition to the bit-vector, in the replication data the updated DSR structure and/or the entire updated data-set, for replication to the at least one replication computing node. The previous version of the bit vector may be stored in the master storage 310 together with the corresponding previous version of the data set and/or DSR structure. Once the replication data is ready, it is forwarded to a data transmission engine 327 which is configured to transmit via a communication network 400 the replication data to the at least one replication computing node 500. The replication data may be compressed by means of a compression engine, which may be part of the data transmission engine before it is transmitted to the at least one replication computing node, where it is decompressed by a decompression engine of the data receiving engine. Any known data compression algorithm may be used for the compression of the replication data. For example, the run-length encoding (RLE) compression algorithm may be used, which is configured to encode a sequence of identical bits in the bit-vector as a number representing the length of the sequence. In some cases, a predetermined symbol generated by the RLE algorithm may be used to denote a bit that may be skipped or that it has not changed. The use of symbols and the number representation of the length of the bit sequence in the bit vector may increase the efficiency of the compression algorithm. Other compression algorithms such as Bzip2, Gzip, ZLIB, in-band and out-of-band dictionary compression algorithms may be used. Classical compression, e.g. gzip, bzip2 works by building a dictionary of the most common sub-strings in the compressed file and then encoding each with the minimum number of bits. The data dictionary is inside the compressed file; thus, when travelling on the network, the data dictionary is referred to as "in-band". On the other hand, out-of-band dictionary compression consists in:

processing a lot of reference data to extract the (statistically best) data dictionary freeze the dictionary (with an ID/date) and send it to all parties (encoders and decoders) "once and for all" (or at least, do not change it too often . . . )

This saves the network bandwidth of sending the dictionary with each data files. Some examples of out-of-band include Zstandard, and RFC 3284 specifies VCDIFF, a compression format (for HTTP transactions) that uses a default "code table" but allows usage of application-specific code tables.

Figure 4:
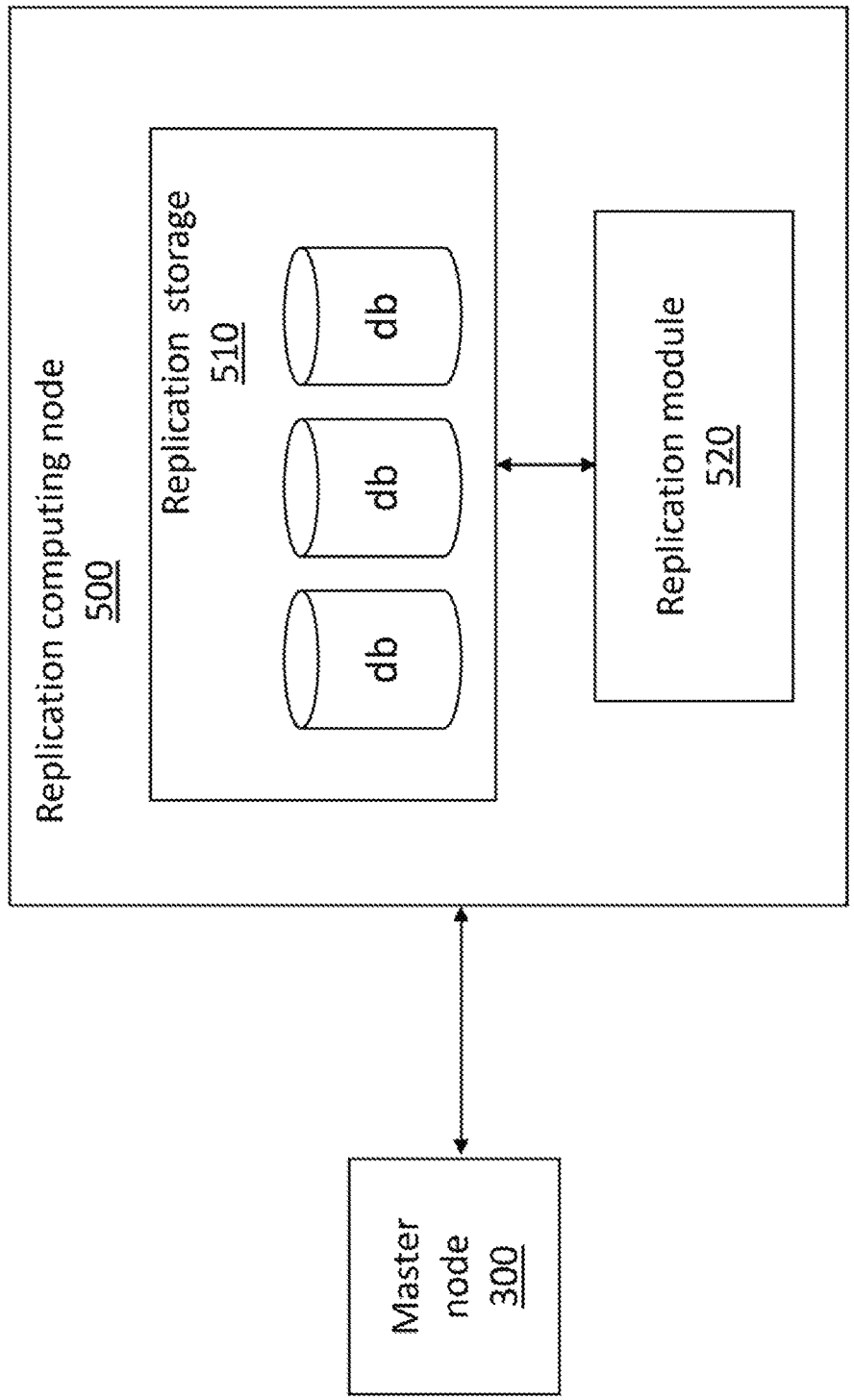
FIG. 4 shows an example of a replication computing node according to embodiments of the present invention.

FIG. 4 shows an example of a replication computing node 500 according to embodiments of the present invention, Each replication computing node 500 may be provided with a replication storage 510 for storing the replication data-sets and associated DSR structures corresponding to the data-sets and associated information stored in the master storage 310. The replication storage 510 may be configured to store substantially the same information as the one stored in the master storage 310. The replication computing node 500 is further provided with a replication module 520 configured to receive and replicate the replication data in the replication storage 510.

Figure 5:
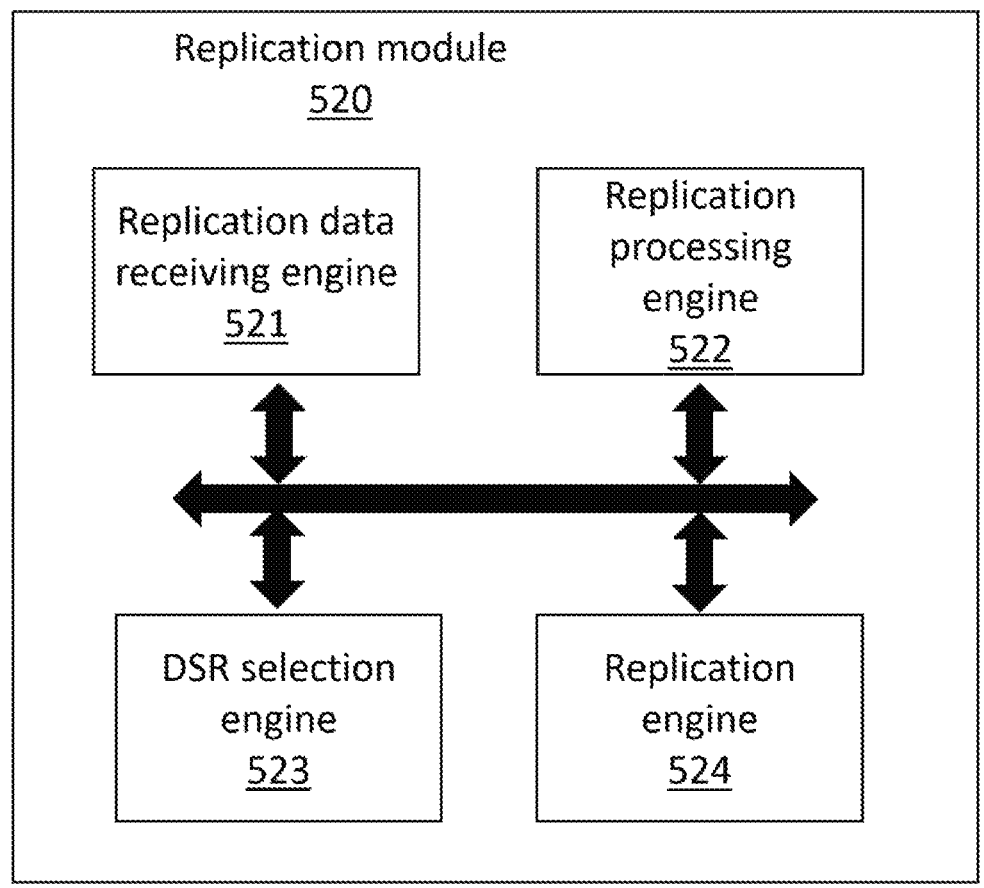
FIG. 5 shows an example of a replication module according to embodiments of the present invention.

FIG. 5 shows an exemplified architecture for the replication module 520. The replication module 520 is provided with a replication data receiving engine 521 configured to receive the replication data. The replication data receiving engine 521 may also identify the replication data-set in the replication storage 510 corresponding to the replication data transmitted. A replication processing engine 522 is provided for processing the replication data to extract the data values to be replicated. A DSR selection engine 523 is provided to select the replication DSR structure to be used in the mapping of the extracted data values to the data fields of the corresponding replication data-set. The DSR selection engine 523 is configured to determine whether the replication data comprises an updated DSR structure. In the case, where an updated DSR structure is transmitted together with the replication data, e.g. when the structure of the stored DSR has changed or expired, then the updated DSR is selected as the replication DSR structure, otherwise the DSR structure of the corresponding stored replication data set is selected as the replication DSR structure. Once the corresponding replication DSR has been selected, a replication engine 524 is provided to replicate the extracted data values of the replication data in the corresponding replication data-set.

FIG. 6 shows an example of a DSR structure generated from a data set received from a data source 100 according to embodiments of the present invention. As shown the DSR structure may identify the different level data records, the type of data fields, e.g. volatile or stable, the size of the data values stored in at least the volatile data fields, e.g. expressed by the number of bits, and other relevant information. For example, in the context of the travel industry, the data-set may represent the different travel recommendations received in response to a query from an airline. The level 1 data record may represent the travel recommendation, Level 2 data record may represent the proposed travel solution, Level 3 data record may represent the different flight route options for the proposed travel solution, and the volatile data fields may represent the seat availability. The seat availability in this example, it is expected to change faster, as more customers book the proposed travel solution, as compared to the flight route options, which are determined well advanced.

Figure 7:
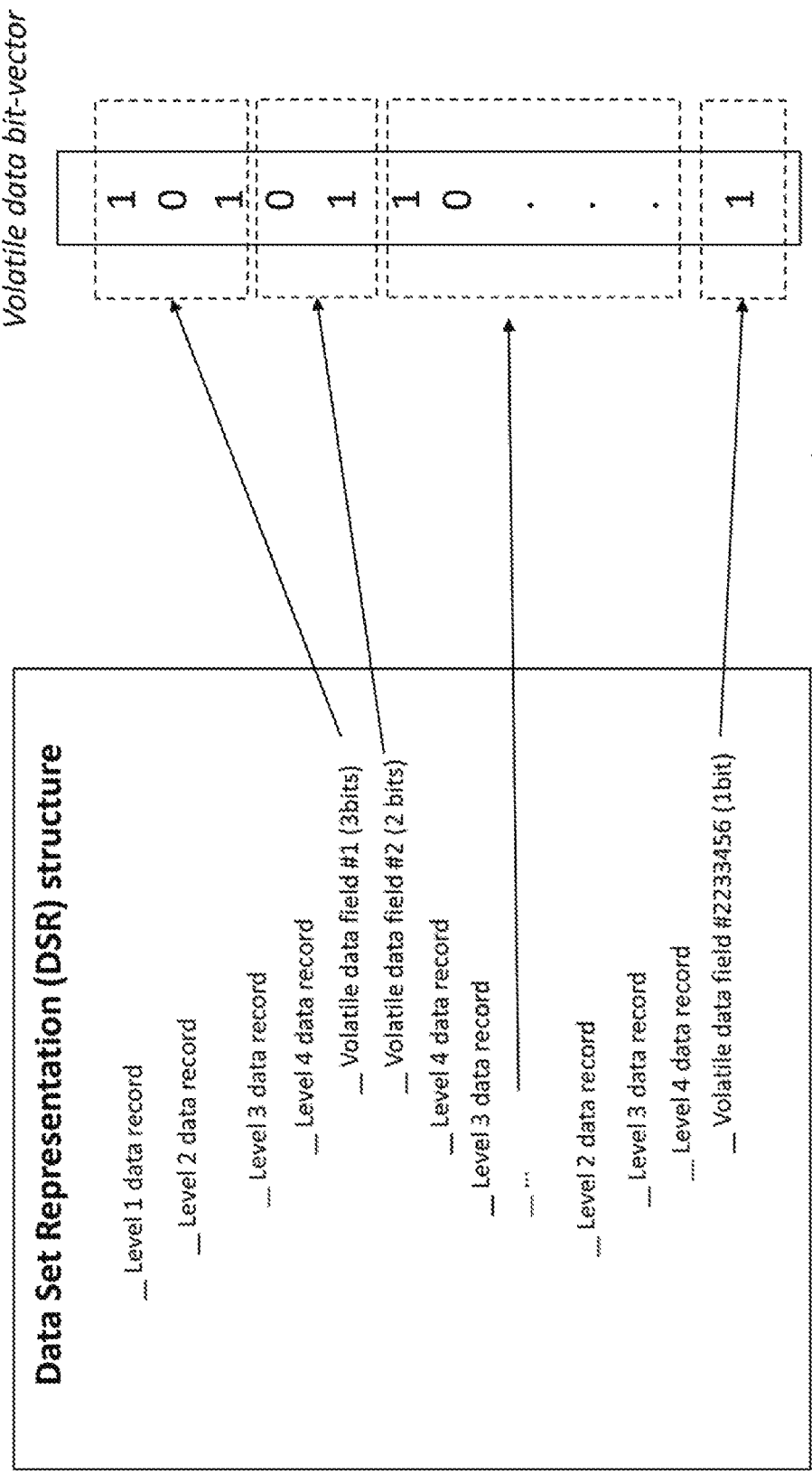
FIG. 7 shows an example of a bit-vector storing data values extracted from the volatile data fields of the DSR structure shown in FIG. 6, according to embodiments of the present invention.
Figure 8:
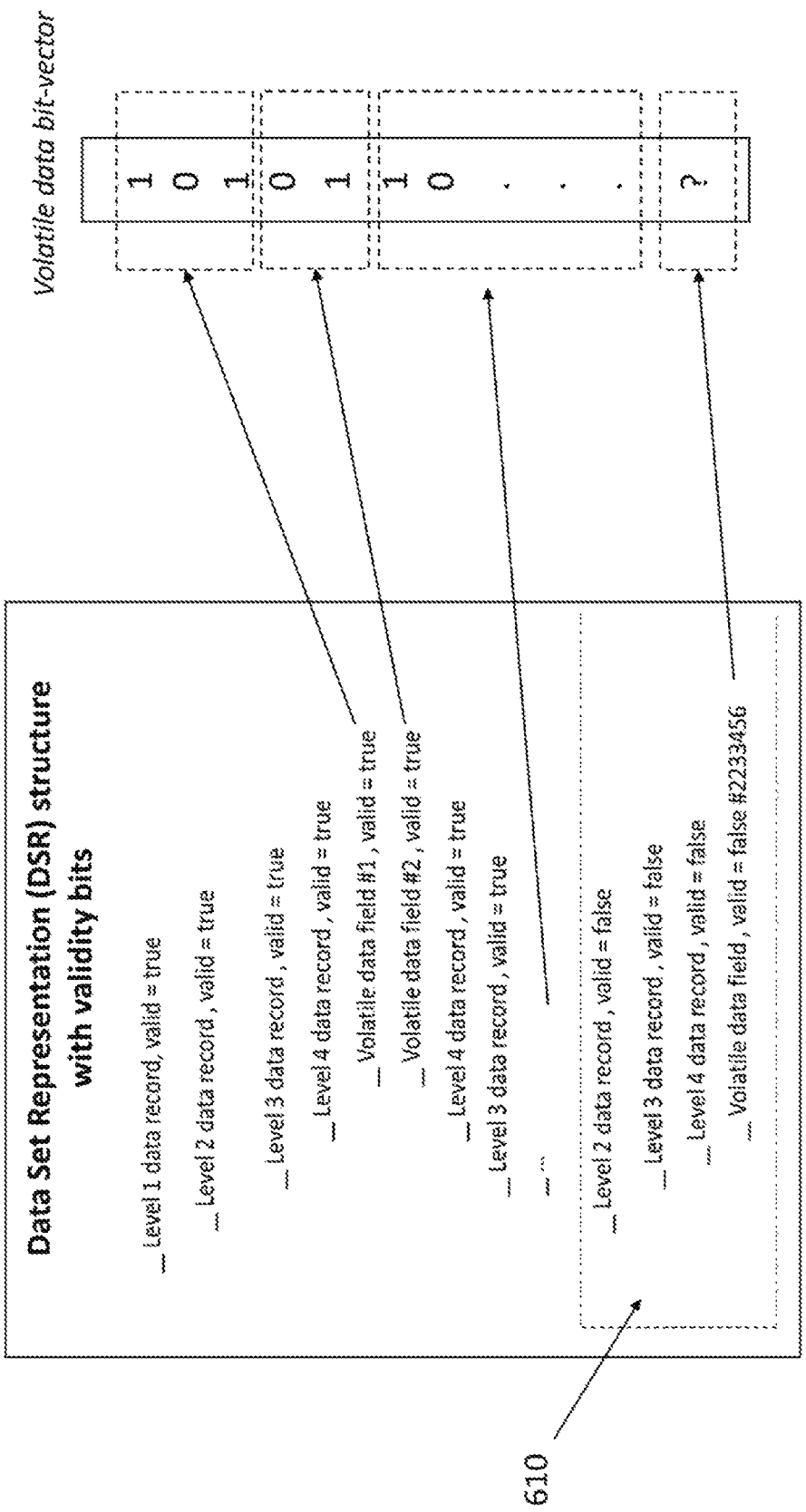
FIG. 8 shows an example of a DSR structure containing validity bits and their corresponding representation in the bit-vector according to embodiments of the present invention.

FIG. 7 shows an example of a generated bit-vector based on a DSR structure according to embodiments of the present invention. The bit-vector, also known as bit array, bit map, bit set, or bit string, is an array data structure that compactly stores bits. It can be used to implement a simple set data structure. A bit-vector is effective at exploiting bit-level parallelism in hardware to perform operations quickly. A bit array offers dense storage for "random" bits, that is, where each bit is equally likely to be 0 or 1, and each one is independent. However, most data is not random so it may be possible to store it more compactly. For example, the data of a typical fax image is not random and can be compressed. Run-length encoding is commonly used to compress these long streams. As shown in FIG. 7, the data value of each volatile data field is represented in the bit-vector by the number of bits indicated in the DSR structure. For example, volatile data field #1 is represented by three bits, while the volatile data field #2 is represented by two bits. The data values are represented in the bit-vector in the order identified by the DSR, so first is volatile data field #1, then volatile data field #2, and last is volatile data field #2233456. As shown in FIG. 8, the DSR structure may be provided with additional data fields 610, referred to as validity bits, which are used to accommodate changes in the data-set, e.g. addition of a data record. The validity data bits 610 are considered to be volatile data fields and are included in the bit-vector.

Figure 9:
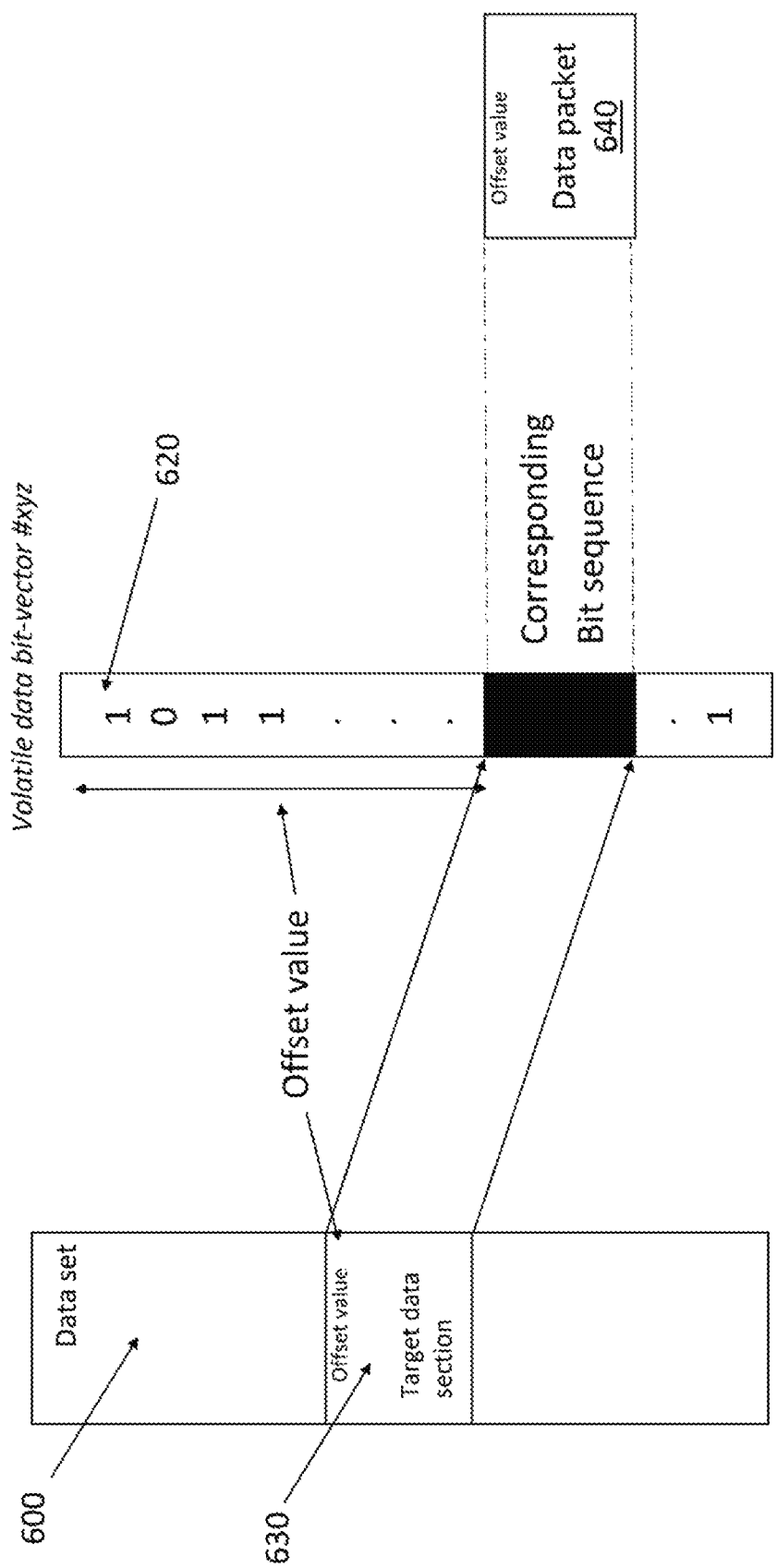
FIG. 9 shows an example of creating data packets with an offset value from a data-set according to embodiments of the present invention.

According to embodiments of the present invention, the bit-vector and/or the entire replication data may be divided into data packets, which may be of the same or different data size. FIG. 9, shows an example of a bit-vector data packet 640 generated for corresponding target data section 630 of a data-set 620. Each data packet 640 may be independently transmitted to the at least one replication computing node 500 where all data packets 640 are collected and processed by a data reconstruction engine of the replication data receiving engine 521 to reconstruct the replication data. By breaking the replication data into data packets 640, it becomes possible to transmit the data packets in parallel thus increase the speed at which the data is transmitted from the master computing node to the at least one replication computing node. Further breaking the bit-vector and/or the replication data into smaller data packets may be necessary to satisfy the bandwidth of the transmission communication network. For example, in the case where the size of the bit-vector is larger than the acceptable bandwidth of the communication network. Each data packet 640 may be provided with an offset value, which may be indicative of the number of bits separating the first bit of the volatile data bit-vector 620 from the first bit of each data packet 640. The offset value of each data packet 640 denotes the order in which the data packets need to be assembled in order to reconstruct the bit-vector and/or the replication data.

Figure 10:
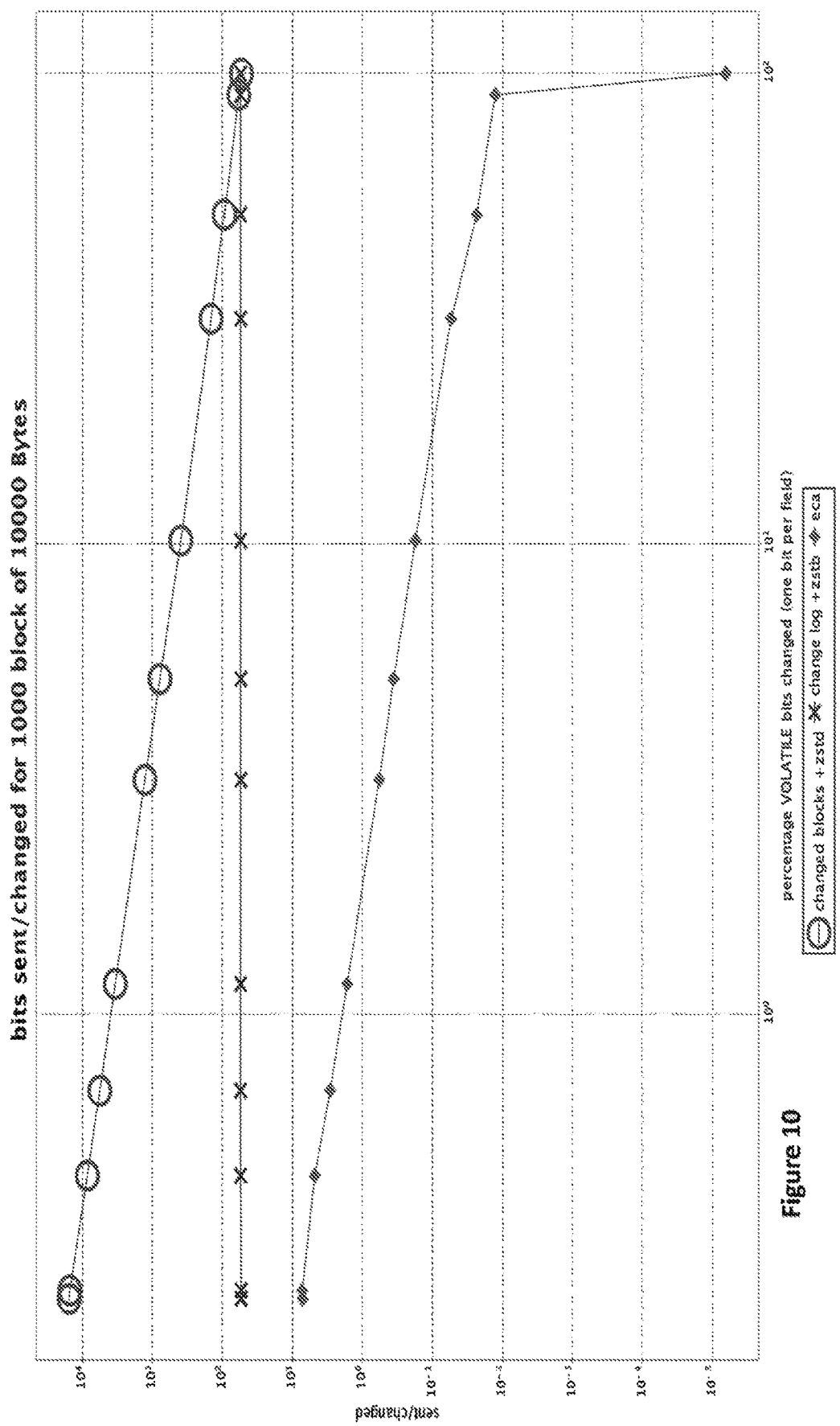
FIG. 10 shows simulation results comparing the performance of the proposed approach with existing solutions.
Figure 11:
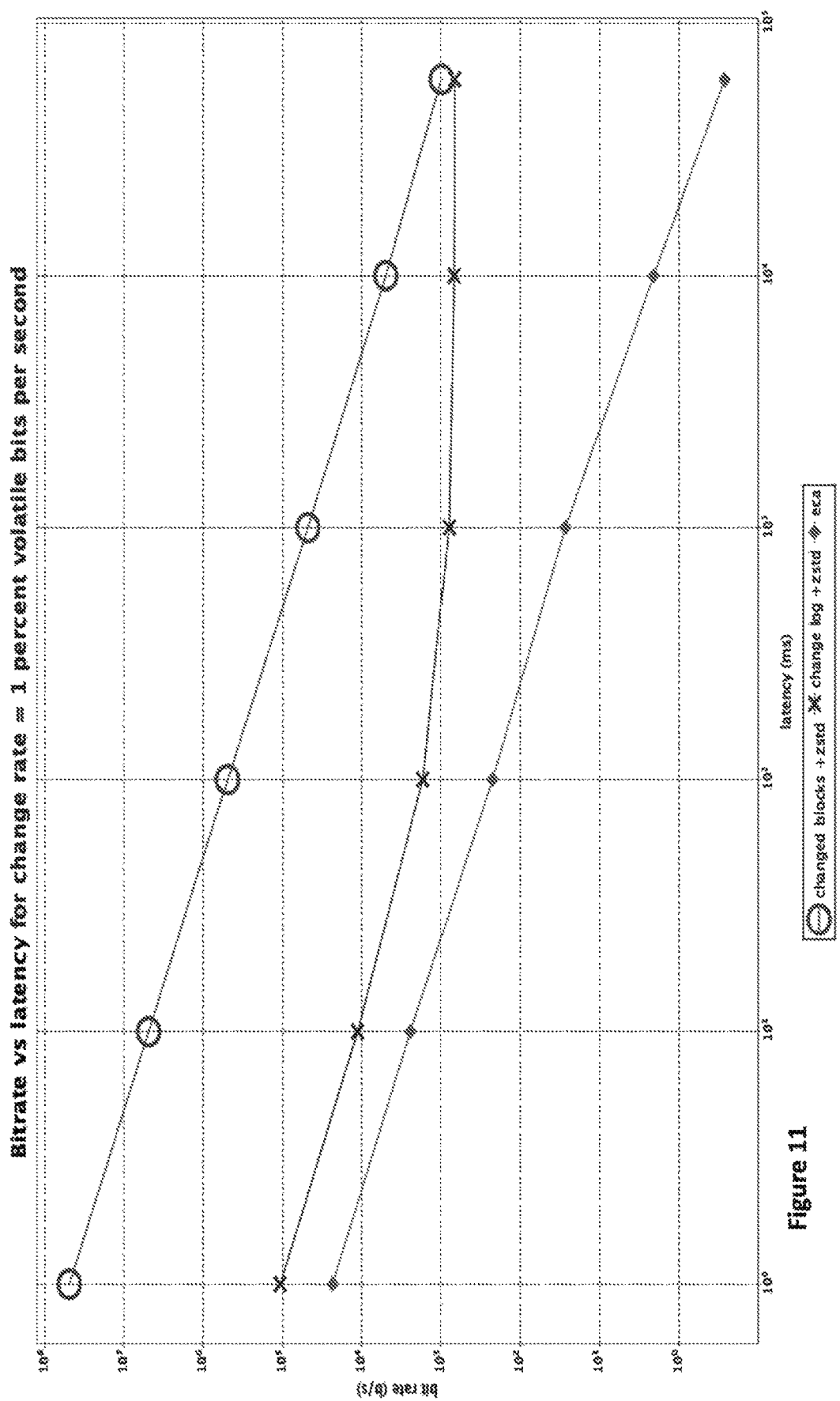
FIG. 11 shows further simulation results comparing the performance of the proposed approach with existing solutions.

FIGS. 10 and 11 show the results of a simulation for performance comparison between the present replication approach (labelled as "ECA" for Eventual Consistency Accelerator), and 2 "classical" database replication techniques. The first one is labelled "changed blocks". It consists in transmitting blocks when they have changed. In this simulation, the block size is 10000 Bytes (which is close to the default block sizes found in existing products). The second compared method is labelled as "change log" consists in transmitting the database change log. We assume that the only changes are updates (no insertion, no deletion). Here the simulated database size is 10 million Bytes i.e. 1000 blocks, but the results scale to any size. We simulate fields defined by an eight bytes key and a one-bit (volatile) data field. For both compared methods, in order to be fair, the same compression method is applied, i.e. the zstd.

In FIG. 10, the chosen performance indicator is "bits sent/bits changed", the smaller, the better, which characterize the ability to transmit as few bits (sent) as possible to replicate a given amount of change measured in bits (changed). (log of) sent/changed is plotted with the horizontal axis representing the (log of) the percentage of volatile bits changed. The top curve (circles) shows the performance of transmitting changed blocks. The horizontal curve (crosses) show the performance of transmitting the change log. These curves meet on the right for 100% bits changed because both compared methods then transmit the full data (compressed). Note also that the change log curve is horizontal because by definition of a change log, the amount of data sent is proportional to the amount of change. The bottom curve (diamonds) shows the performance of the proposed method (labelled as "ECA"). It clearly shows the performance advantage. (The point on the bottom right is because the simulation assume that we transmit only one byte to signal "all bits have changed". In practice "all bits have been flipped" is not realistic for most applications. For example, with a uniform change distribution the asymptotic ("maximum") amount of change is 50% due to the bits that have been flipped an even number of times and are therefore "not changed" compared to the initial state).

FIG. 11 represents for the same simulation the network bit rate required as a function of the "latency" assuming a database that undergoes a constant change rate of 1 percent of the volatile bits per second. (a constant change rate may not be realistic but is useful as we will see now). In the real world, the operator of the system is always faced with a trade-off: one has to decide how much time to wait before transmitting updates. Intuitively, if data is transmitted more often, the network cost increases. With a constant change rate, "often" is a time: it is the time until a certain amount or change has been observed. We call this time "latency" since it the minimum time the receiving side has to wait for the data to become updated (the network transmission time having to be added, of course). In FIG. 11, the right most points correspond to a one-minute latency, the left most ones to one millisecond. Similarly, ECA performance (bottom curve, diamonds) is clearly superior on the whole range of latencies.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. The computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using the computer readable storage medium having the computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other robust state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general-purpose computer, particular purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the Applicants to restrict or in any way limit the scope to such detail.

The invention claimed is:

1. A method for maintaining consistency of data between data-sets stored in a master database of a master computing node and corresponding data-sets stored in a replication database of at least one replication computing node, wherein each time an updated version of a stored data-set is received, the master computing node is configured for updating a corresponding data-set stored in the master database and transmitting replication data relating to the updated data-set version to the at least one replication computing node for replication, each data-set comprising a plurality of data fields arranged in a predetermined layout defined according to a data-set representation (DSR) structure, which is stored together with each data-set in the master and replication databases, the method comprising:

processing at the master computing node by means of a master processing module an updated version of a stored data-set, the step of processing comprising:
receiving by means of a data receiving engine, the updated version of a stored data-set in the master database;
processing the updated data-set version by means of a processing engine to generate an updated DSR structure;
analyzing the updated DSR structure by means of an analyzing engine to extract the data fields of the updated data-set version;
classifying by means of a classification engine the extracted data fields into stable data fields, comprising data values that change at a first frequency rate, and volatile data fields, comprising data values that change at a second frequency rate, which is higher than the first frequency rate, the updated DSR structure defining an order of the volatile data fields, and a size of the data values stored in the at least the volatile data fields;
generating by means of a bit-vector engine, a bit-vector storing the data values extracted from the volatile data fields, the data values extracted from the volatile data fields stored in the bit-vector in the order identified by the updated DSR structure;
preparing by means of a data preparation engine the data to be replicated at the least one replication computing node, the replication data comprising the bit-vector; and
transmitting by means of a data transmission engine the replication data to the at least one replication computing node; and
replicating at the at least one replication computing node by means of a replication module the replication data, the step of replication comprising:
receiving by means of a replication data receiving engine the replication data;
processing by means of a replication processing engine the replication data to extract the data values to be replicated;
selecting by means of a DSR selection engine a replication DSR structure corresponding to the replication data; and
replicating by means of a replication engine, based on the selected replication DSR structure, data values extracted from the replication data in the corresponding replication data-set.

2. The method of claim 1, wherein the bit-vector is generated by concatenating the data values of the volatile data fields.

3. The method of claim 1, wherein each volatile data field stores a data value of a predetermined data size represented in binary format.

4. The method of claim 3, wherein the data size of each volatile data field is identified in the DSR structure.

5. The method of claim 3, wherein the bit-vector is configured to store serially the bits representing the data-value of each volatile data field.

6. The method of claim 1, wherein the replication data is compressed by means of a compression engine of the data transmission engine before the replication data is transmitted to the at least one replication computing node, where the replication data is decompressed by a decompression engine of the data receiving engine.

7. The method of claim 6, wherein the compression engine is configured to select a compression method from a compression database, the compression method applied to the replication data is encoded and transmitted to the at least one replication node, where the replication data is used by the decompression engine to select a corresponding decompression method from a decompression database to decompress the replication data.

8. The method of claim 1, wherein the replication data consists of the bit-vector, or the bit-vector and the DSR structure.

9. The method of claim 1, wherein the bit-vector is encoded as a difference from a previous bit-vector generated for a previous version of the corresponding data-set.

10. The method of claim 1, wherein the step of generating the bit-vector comprises comparing the updated DSR structure with the DSR structure of the data-set stored in the master database to identify differences in the layout of the data fields in the updated data-set, and wherein when a difference in the data-set layout is detected one or more of the entire updated DSR structure and the entire updated data-set is included in the replication data.

11. The method of claim 10, wherein the step of selecting the replication DSR structure at the at least one replication computing node comprises determining whether the replication data comprises an updated DSR structure, wherein when an updated DSR structure is transmitted then the updated DSR structure is selected as the replication DSR structure, otherwise the DSR structure of the stored replication data-set is selected as the replication DSR structure.

12. The method of claim 1, wherein the step of transmitting comprises dividing the replication data into data packets, which are independently transmitted to the at least one replication computing node where the data packets are collected and processed by a data reconstruction engine of the data receiving engine to reconstruct the replication data.

13. The method of claim 12, wherein the first data value of each data packet defines an offset value associated with the sequence order of the data packets in the replication data.

14. The method of claim 13, wherein the offset value is indicative of the number of bits separating the first bit of the replication data from the first bit of each data packet.

15. The method of claim 1, wherein the DSR structure generated for each corresponding data-set comprises at least one place-holder data field for accommodating changes in the DSR structure, the place-holder data field comprises a validity bit, the value of the validity bit is indicative of whether the place-holder data field contains a data value, which data value is classified as a volatile data value.

16. A consistency acceleration engine for maintaining consistency of data between data-sets stored in a master database of a master computing node and a replication database of at least one replication computing node of a distributed computer architecture, wherein each time an updated version of a stored data-set is received, the master computing node is configured for updating a corresponding data-set stored in the master database and transmitting replication data relating to the updated data-set version to the at least one replication computing node for replication, each data-set comprising a plurality of data fields arranged in a layout defined according to a corresponding data-set representation (DSR) structure, which is stored together with the corresponding data-set in the master and replication databases, the consistency acceleration engine comprising:

a master processing module configured to process at the master computing node a stored data-set, the master processing module comprising:

a data receiving engine configured to receive an updated version of a stored data-set corresponding to a stored data-set in the master database;

a processing engine configured to process the updated data-set version to generate an updated DSR structure;

an analyzing engine configured to analyze the updated DSR structure to extract the data fields of the updated data-set version;

a classification engine configured to classify the extracted data fields into stable data fields, comprising data values that change at a first frequency rate, and volatile data fields, comprising data values that change at a second frequency rate, which is faster than the first frequency rate, the updated DSR structure defining an order of the volatile data fields, and a size of the data values stored in the at least the volatile data fields;

a bit-vector engine configured to generate a bit-vector storing the data values extracted from the volatile data fields, the data values extracted from the volatile data fields stored in the bit-vector in the order identified by the updated DSR structure;

a data preparation engine configured to prepare the data to be replicated, the replication data comprising the bit-vector; and data transmission engine configured to transmit the replication data to the at least one replication computing node; and a replication module configured to replicate at the at least one replication computing node the replication data, the replication module comprising:

a replication data receiving engine configured to receive the replication data;

a replication processing engine configured to process the replication data to extract the data values to be replicated;

a DSR selection engine configured to select a replication DSR structure corresponding to the replication data; and a replication engine configured to replicate, based on the selected replication DSR structure, the extracted replication data values in the corresponding replication data-set stored in a replication database.

\* \* \* \* \*